United States Patent [19]

Runge

[11] Patent Number: 5,204,803
[45] Date of Patent: Apr. 20, 1993

[54] NEUTRAL SYSTEM FOR ELECTRIC DISTRIBUTION PANELBOARD

[75] Inventor: Louis L. Runge, Clinton, Miss.

[73] Assignee: Westinghouse Electric Corp., Pittsburgh, Pa.

[21] Appl. No.: 810,089

[22] Filed: Dec. 19, 1991

[51] Int. Cl.[5] .................. H01B 17/06; H02B 1/20
[52] U.S. Cl. ........................ 361/361; 174/92; 174/138 E; 361/355; 439/937
[58] Field of Search ............. 307/147; 439/212, 485, 439/718, 731, 733, 810, 814, 892, 937, 532, 533, 542; 174/16.2, 68.2, 71 B, 72 B, 88 B, 99 B, 92, 138 E, 149 B; 361/346, 353–355, 356, 358, 361, 376, 383

[56] References Cited

U.S. PATENT DOCUMENTS

| | | | |
|---|---|---|---|
| 4,079,439 | 3/1978 | Coles | 361/355 |
| 4,118,754 | 10/1978 | Duggan | 361/355 |
| 4,167,769 | 9/1979 | Luke | 361/355 |
| 4,180,845 | 12/1979 | Shariff | 361/334 |
| 4,536,823 | 8/1985 | Ingram | 361/355 |
| 4,667,269 | 5/1987 | Morby | 361/355 |
| 4,785,377 | 11/1988 | Rhodes | 361/355 |
| 4,916,574 | 4/1990 | Hancock | 361/355 |

*Primary Examiner*—Gerald P. Tolin
*Attorney, Agent, or Firm*—M. J. Moran

[57] ABSTRACT

An insulated neutral bus has a base, top and conductive bus therebetween. Ribs extend from the base and frictionally engage ribs extending from the top. A recess is preferably provided in the bus so that the bus may fit behind a removable panelboard interior.

13 Claims, 3 Drawing Sheets

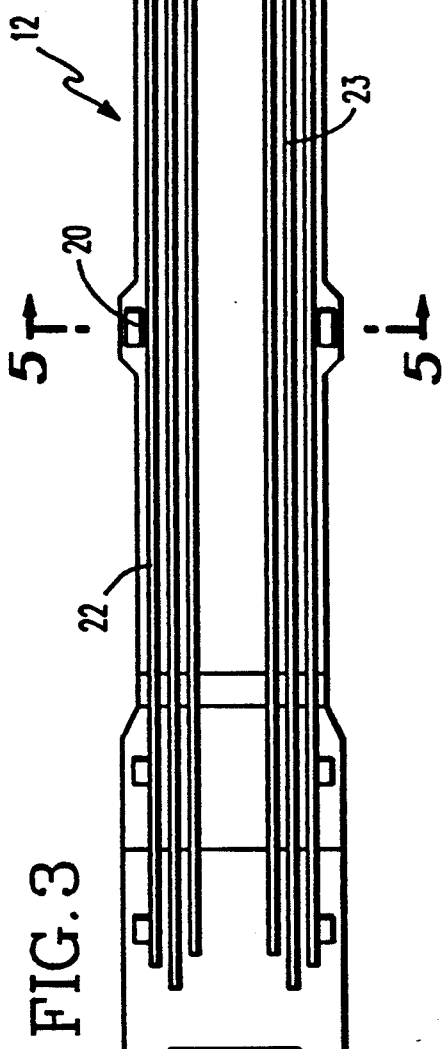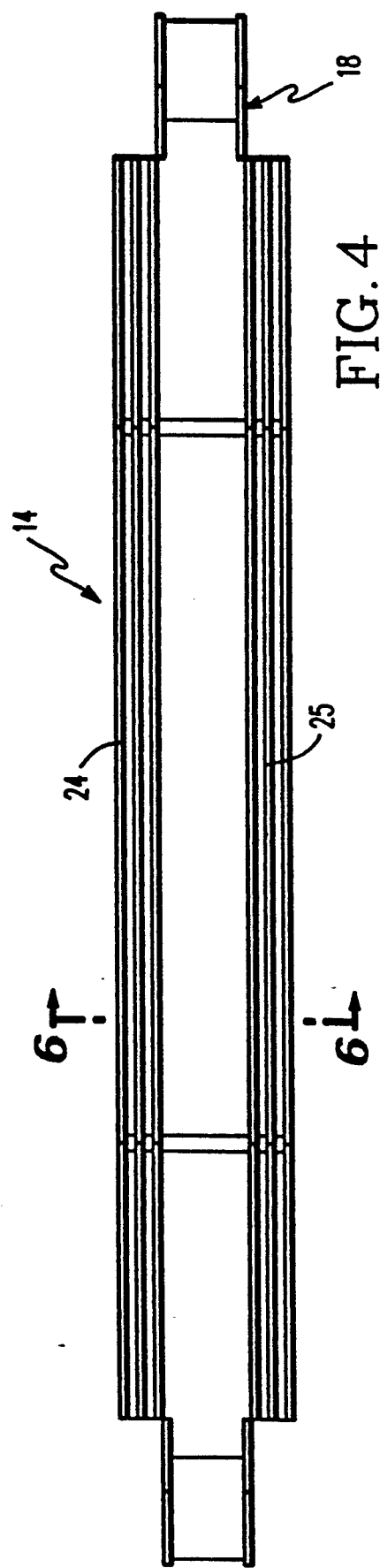

NEUTRAL SYSTEM FOR ELECTRIC DISTRIBUTION PANELBOARD

BACKGROUND OF THE INVENTION

1. Field of the Invention

This invention relates generally to electrical distribution panelboards of the type having two generally parallel branch circuit wiring terminals connected by an insulated bus.

2. Description of the Prior Art

Panelboards are commonly used in home and industrial buildings for electrical distribution. The function of a neutral system within such panelboards is to provide a means to electrically connect a ground feeder conductor to appropriate branch circuit conductors. This is accomplished with an arrangement of electrical wire connectors, bus bars, insulators and supports. A split neutral provides branch circuit wiring terminals along each of two wire gutters of the panelboard with a bus bar connecting the two terminals or groups of terminals. The connecting bus bar normally must be insulated from surrounding sheet metal components. Commonly the art has used heat or chemically activated shrink tubing, electrical tape, or formed sheet installation. The application of shrink tubing normally requires a trimming process to remove tubing from the end surfaces where electrical connections are made. Electrical tape must be hand wound around the bus bar. Improper winding could leave gaps which would create an electrical short or could create bulges which could prevent proper spacing of components within the panelboard. The art has also used formed sheet installation which must be properly trimmed and in some instances requires special equipment for installation. Thus, there is a need for a simple, easy to install insulating system for bus bars which could be installed in a short time with a minimum amount of errors.

Morby et al. in U.S. Pat. No. 4,667,269 discloses a panelboard having a pair of generally parallel neutral terminal connectors. An insulated metal cross arm connects the two components. The cross arm is enclosed by two insulating sidewalls which snap together. This snap-type installation overcomes many of the shortcomings of the tubing, tape and sheet installation. However, the saddle is affixed on top of the neutral terminals. The saddle provides no control over the spacing of the neutral terminals. Moreover, after the saddle is connected it is difficult or impossible to remove the other components in the panelboard without first removing the saddle.

SUMMARY OF THE INVENTION

I provide a split neutral system having snap-on insulators which fit over a connecting bus. The insulators and bus are shaped to pass behind the interior assembly thereby permitting independent removal of other panelboard components. The snap-in insulators are provided with parallel ribs which assure required electrical spacings and provide structural rigidity. Ribs on the top insulator nest within ribs on the base insulator to assure proper fit and location.

BRIEF DESCRIPTION OF THE DRAWINGS

FIG. 3 is a top plan view of the base insulator used in the embodiment of FIG. 1.

FIG. 4 is a bottom plan view of the top insulator used in the embodiment of FIG. 1.

DESCRIPTION OF THE PREFERRED EMBODIMENTS

Figure 1:
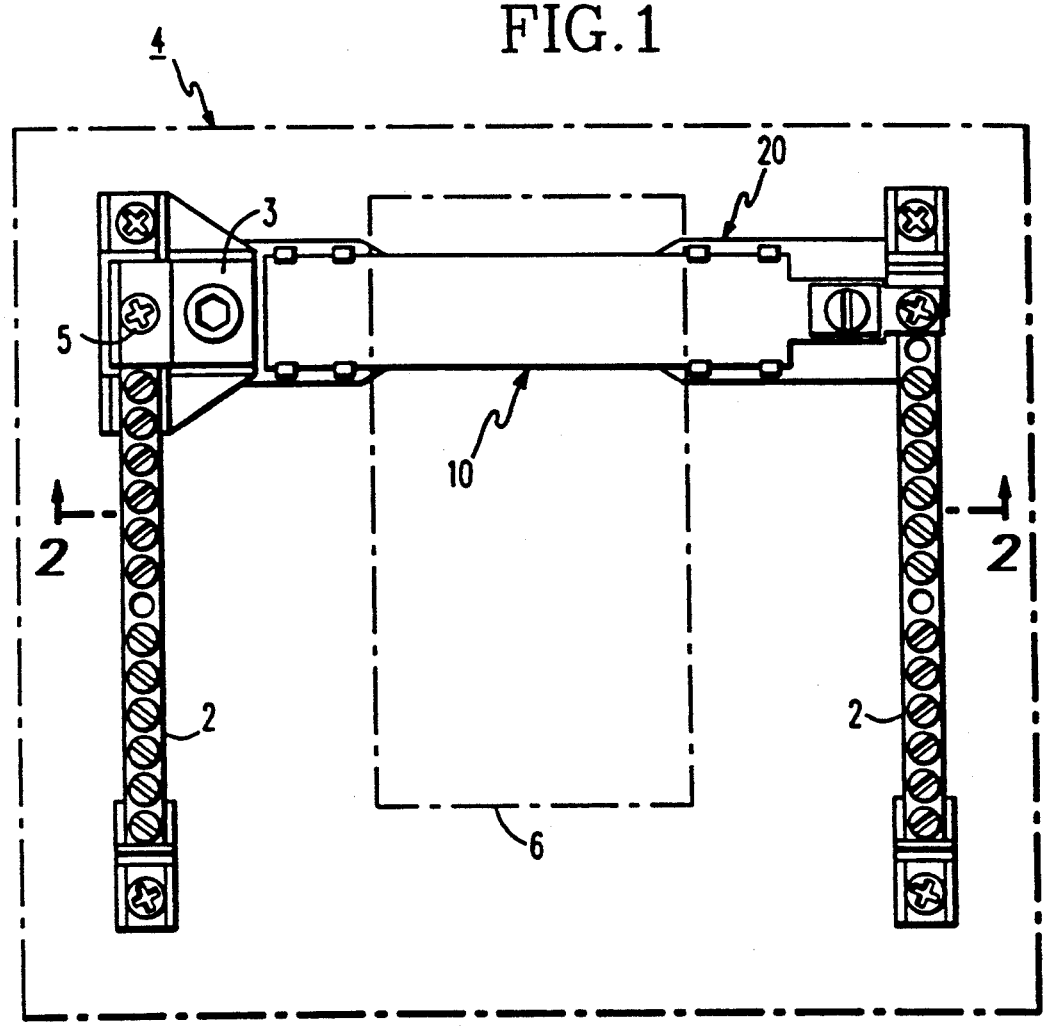
FIG. 1 is a plan view of my improved neutral system positioned within a panelboard.

Referring to FIG. 1 we provide a pair of neutral connectors positioned generally parallel to one another within a panel box 4. An insulated bus 10 runs between two neutral connectors 2. The insulated bus 10 is comprised of a base insulator 12, a top insulator 14 and a conductive bus 16 running therebetween. This insulated bus is shaped so that a removable panelboard interior 6 can be placed on top of the insulated bus 10. I also prefer to place the insulated bus 10 against the backwall of the panel box 4. The contact between the base insulator 12 and the panel box 4 allows heat from the connecting bus to sink into the panel box. Consequently, I can use a minimum cross-section for the current carrying conductive bus 16 which enhances compactness and reduces material costs. The base insulator has integrally molded hooks 20 which snap over the edges of the top insulator 14. I provide at least two and preferably three generally parallel ribs 22 and 23 along each side of the base 12. Similarly, I prefer to provide at least two and preferably three parallel ribs 24 and 25 along each side of the top insulator 14. These sets of ribs 22, 23, 24 and 25 are positioned so that when the base 12 and top 14 are assembled with a conductive bus therebetween at least two parallel top ribs and at least two parallel base ribs are on either side of the bus. The ribs are further positioned so that ribs on the top insulator will nest between the ribs on the bottom insulator when the top insulator and bottom insulator are connected together. The height of the ribs is selected so that a bus bar will snugly fit within the connected top insulator 14 and base insulator 12. For 1/16 inch bus bar I prefer to use 0.05 inch ribs. The ribs are of uniform height. Thus, they assure that the insulated bus 10 will be of consistent thickness throughout its length. I have made such an insulated bus 10 having a total thickness of 13/64 inch.

Figure 2:
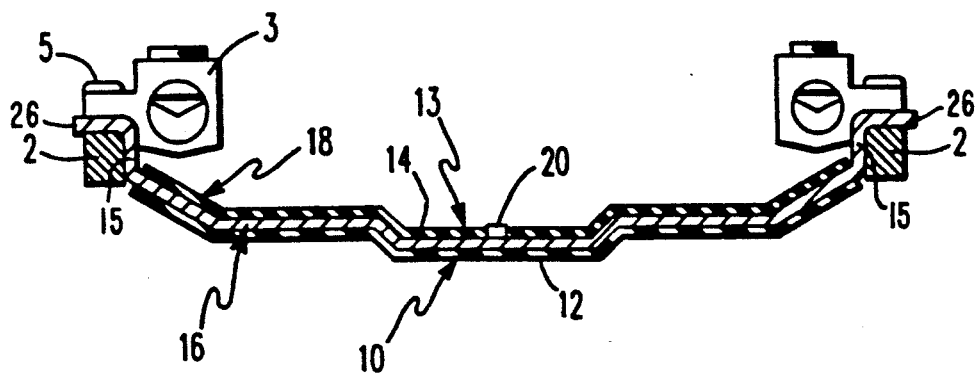
FIG. 2 is a sectional view taken generally along the line II—II of FIG. 1.
Figure 5:
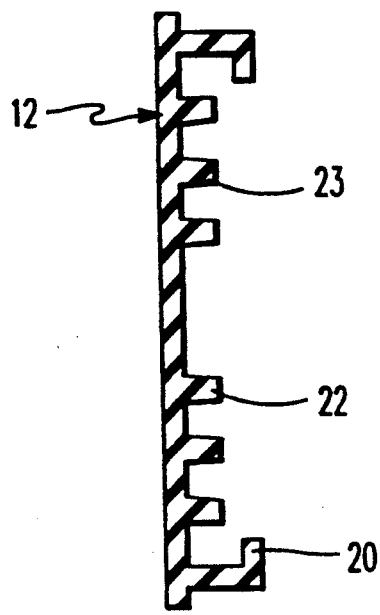
FIG. 5 is a sectional view taken along the lines V—V in FIG. 3.
Figure 6:
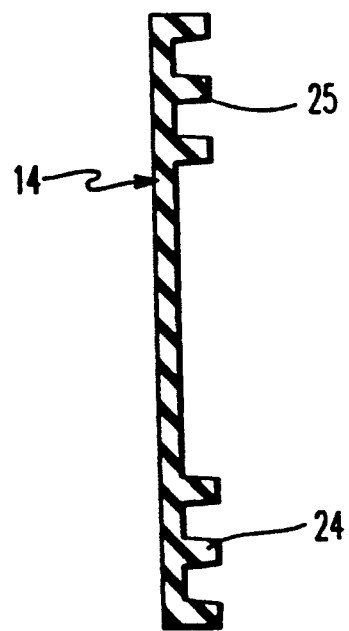
FIG. 6 is a sectional view taken along the line VI—VI in FIG. 4.

As can be seen in FIG. 2, I prefer to provide a recessed central portion 13 in the insulated bus 10. This recess portion is sized and configured so that a removable panelboard interior 6 will fit comfortably therein. I prefer to provide an upwardly rising sidewall 18 along either end of bus 16. A substantially vertical wall 15 and attached horizontal land 26 are provided to form each end of the bus. The top insulator 14 and base insulator 12 are shaped to conform to conductive bus 16. The connecting bus land 26 is for attachment to a connecting bus 2 or neutral terminal wire connector 3 or both. When land 26 is sized and positioned as shown in FIGS. 1 and 2, a single mechanical fastener 5 can be used to connect both the connecting bus 2 and the wire connector 3 to the conductive bus 16.

Although a variety of plastic materials can be used to make the base insulator 12 and top insulator 14, we prefer to use thermoplastic materials such as polypropylene and noryl. These types of material provide acceptable electrical insulation and structural integrity at a reasonable cost.

Although I have disclosed certain present preferred embodiments of my neutral system, it is to be understood that the invention is not limited thereto but may be variously embodied within the scope of the following claims:

I claim:

1. An insulated neutral bus having ends suitable for attachment to two parallel connecting buses or wiring terminals or both and sized so that a removable panelboard interior will fit between the ends comprising
   a) a conductive bus having an elongated central portion, a pair of upwardly rising sidewalls attached to opposite ends of the central portion and a pair of end portions each attached to a sidewall and comprised of a substantially vertical wall and a substantially horizontal land extending from one end of the vertical wall, each vertical wall being attached to an upwardly rising sidewall, the horizontal land being sized for attachment to a neutral bar, the central portion and sidewalls being sized so that a removable panelboard interior will fit thereon and be positioned between the vertical walls;
   b) an electrically non-conductive base configured to conform to the conductive bus and on which the conductive bus rests, the base having a first set of at least two spaced ribs extending along at least a portion of one side of the conductive bus and a second set of at least two spaced apart ribs extending along an opposite side of the conductive bus; and
   c) an electrically non-conductive top sized and positioned to conform to and fit over the base and conductive bus and rest thereon, the top having a first rib frictionally engaging the first set of ribs and a second rib frictionally engaging the second set of ribs.

2. The insulated neutral bus of claim 1 wherein the base and top are plastic.

3. The insulated neutral bus of claim 2 wherein the plastic is a thermoplastic.

4. The insulated neutral bus of claim 1 also comprising a plurality of hooks extending from the base, the hooks fitting over and retaining the top.

5. The insulated neutral bus of claim 1 wherein the conductive bus, base and top are sized to provide a substantially uniform thickness to the insulated bus across the recess.

6. The insulated neutral bus of claim 5 wherein the uniform thickness is 13/64 inch.

7. An improved electrical distribution center of the type having a panel box containing two generally parallel branch circuit wiring terminals connected by an insulated neutral bus and a panelboard interior positioned between the branch circuit wiring terminals wherein the improvement comprises an insulated bus having ends suitable for attachment to two parallel connecting buses or wiring terminals or both and sized so that a removable panelboard interior will fit between the ends comprised of
   a) a conductive bus having an elongated central portion positioned under the panelboard interior, a pair of upwardly rising sidewalls attached to opposite ends of the central portion and a pair of end portions each attached to a sidewall and comprised of a substantially vertical wall and a substantially horizontal land extending from one end of the vertical wall, each vertical wall being attached to an upwardly rising sidewall, the horizontal land being sized for attachment to a neutral bar, the central portion and sidewalls being sized so that a removable panelboard interior will fit thereon and be positioned between the pair of vertical walls;
   b) an electrically non-conductive base configured to conform to the conductive bus and on which the conductive bus rests, the base having a first set of at least two spaced ribs extending along at least a portion of one side of the conductive bus and a second set of at least two spaced apart ribs extending along an opposite side of the conductive bus; and
   c) an electrically non-conductive top sized and positioned to conform to and fit over the base and conductive bus and rest thereon, the top having a first rib frictionally engaging the first set of ribs and a second rib frictionally engaging the second set of ribs.

8. The improved electrical distribution center of claim 7 wherein the panel board interior is placed on top of at least a portion of the insulated bus.

9. The improved electrical distribution center of claim 7 wherein the base and top are plastic.

10. The improved electrical distribution center of claim 9 wherein the plastic is a thermoplastic.

11. The improved electrical distribution center of claim 7 also comprising a plurality of hooks extending from the base, the hooks fitting over and retaining the top.

12. The improved electrical distribution center of claim 7 wherein the conductive bus, base and top are sized to provide a substantially uniform thickness to the insulated neutral bus across the recess.

13. The improved electrical distribution center of claim 12 wherein the uniform thickness is 13/64 inch.

* * * * *